(12) United States Patent
Lee et al.

(10) Patent No.: US 11,932,982 B2
(45) Date of Patent: Mar. 19, 2024

(54) SUPPORTING DEVICE AND LAUNDRY TREATING APPARATUS HAVING THE SAME

(71) Applicant: SAMSUNG ELECTRONICS CO., LTD., Suwon-si (KR)

(72) Inventors: Jung Hee Lee, Suwon-si (KR); Min Sung Kim, Suwon-si (KR); Kwan Woo Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 496 days.

(21) Appl. No.: 17/271,104

(22) PCT Filed: Aug. 6, 2019

(86) PCT No.: PCT/KR2019/009823
§ 371 (c)(1),
(2) Date: Feb. 24, 2021

(87) PCT Pub. No.: WO2020/045847
PCT Pub. Date: Mar. 5, 2020

(65) Prior Publication Data
US 2021/0214879 A1     Jul. 15, 2021

(30) Foreign Application Priority Data
Aug. 28, 2018    (KR) ........................ 10-2018-0101433

(51) Int. Cl.
*D06F 39/12*        (2006.01)
*D06F 58/02*        (2006.01)
(Continued)

(52) U.S. Cl.
CPC ............ *D06F 39/125* (2013.01); *D06F 58/02* (2013.01); *D06F 58/20* (2013.01); *F16M 7/00* (2013.01)

(58) Field of Classification Search
CPC ........ D06F 39/125; D06F 58/02; D06F 58/20; F16M 7/00
See application file for complete search history.

(56) References Cited

U.S. PATENT DOCUMENTS

| 3,329,928 | A | * | 7/1967 | Broske | ..................... H01R 4/08 439/783 |
| 6,409,129 | B1 | | 6/2002 | Chen et al. | |

(Continued)

FOREIGN PATENT DOCUMENTS

| CN | 1683673 A | 10/2005 |
| DE | 29710601 U1 | 8/1997 |

(Continued)

OTHER PUBLICATIONS

International Search Report, PCT/ISA/210, dated Nov. 22, 2019, in corresponding International Patent Application No. PCT/KR2019/009823.

(Continued)

*Primary Examiner* — Matthew W Ing
(74) *Attorney, Agent, or Firm* — STAAS & HALSEY LLP

(57) ABSTRACT

A supporting device capable of being easily assembled and commonly supporting a washing machine, a dryer, and the like having different leg sizes and a laundry treating apparatus having the same. The laundry treating apparatus includes a laundry treating apparatus main body, a supporting device main body configured to support the laundry treating apparatus main body, a leg coupled to a bottom of the laundry treating apparatus main body, and a supporter installed in the supporting device main body, wherein the supporter includes a guide member configured to accommodate the leg and including an insertion groove, and a fixing member including a fixing protrusion to be inserted (Continued)

into the insertion groove, the fixing member being coupled to the guide member to fix the leg.

14 Claims, 12 Drawing Sheets

(51) Int. Cl.
  *D06F 58/20* (2006.01)
  *F16M 7/00* (2006.01)

(56) References Cited

U.S. PATENT DOCUMENTS

| | | |
|---|---|---|
| 9,255,356 B2 | 2/2016 | Cheon et al. |
| 2005/0172678 A1 | 8/2005 | Kim et al. |
| 2007/0119216 A1 | 5/2007 | Jeong et al. |
| 2011/0241501 A1* | 10/2011 | Heo .................... D06F 29/005 |
| | | 312/107 |

FOREIGN PATENT DOCUMENTS

| | | |
|---|---|---|
| JP | 2015-175218 A | 10/2015 |
| KR | 10-2004-0085516 A | 10/2004 |
| KR | 20080032362 A * | 4/2008 |
| KR | 10-2010-0094678 A | 8/2010 |
| KR | 10-2011-0040260 | 4/2011 |
| KR | 10-1422571 B1 | 7/2014 |

OTHER PUBLICATIONS

Extended European Search Report dated Jul. 2, 2021, in European Application No. 19854727.
Office Action dated Apr. 7, 2023, in Korean Application No. 10-2018-0101433.
Office Action dated Apr. 11, 2023, in European Application No. 19 854 727.5.
Office Action dated Jun. 12, 2023, in Korean Application No. 10-2018-0101433.

* cited by examiner

SUPPORTING DEVICE AND LAUNDRY TREATING APPARATUS HAVING THE SAME

CROSS-REFERENCE TO RELATED APPLICATIONS

This application is a U.S. National Stage Application which claims the benefit under 35 U.S.C. § 371 of International Patent Application No. PCT/KR2019/009823 filed on Aug. 6, 2019, which claims foreign priority benefit under 35 U.S.C. § 119 of Korean Patent Application 10-2018-0101433 filed on Aug. 28, 2018, in the Korean Intellectual Property Office, the contents of both of which are incorporated herein by reference.

TECHNICAL FIELD

The present disclosure relates to a supporting device and a laundry treating apparatus having the same.

BACKGROUND ART

In general, a laundry treating apparatus may include a device having at least one of functions of washing, dehydrating, and drying laundry. For example, a laundry treating apparatus may include a washing machine for washing clothes, and a dryer for drying clothes.

In a laundry treating apparatus, a drum for accommodating clothes is disposed horizontally, so that a clothes inlet may be formed on a front side of a main body of the laundry treating apparatus. The laundry treating apparatus having such a structure has the inconvenience that a user has to bend his or her waist when putting laundry in or out through the clothes inlet, and thus a supporting device is used to position and fix the main body of the laundry treating apparatus at a predetermined height.

As a general process of combining this supporting device to the main body of the laundry treating apparatus, first, the main body of the laundry treating apparatus is tilted and laid down, and legs that are coupled to a bottom of the main body of the laundry treating apparatus are separated, and then an upper surface of the supporting device comes into close contact with the bottom of the main body of the laundry treating apparatus. After that, front and rear surfaces of the supporting device are disassembled to put an assembly tool inside the supporting device, and the legs of the laundry treating apparatus previously separated are fastened inside the supporting device through holes formed on the upper surface of the supporting device to fix the laundry treating apparatus to the supporting device. Finally, the combining process is completed by erecting the main body of the laundry treating apparatus and the supporting device that are combined with each other.

DISCLOSURE

Technical Problem

The present disclosure is directed to providing a supporting device with improved easy assembly and a laundry treating apparatus having the same.

The present disclosure is directed to providing a supporting device capable of commonly supporting laundry treating apparatuses having different leg sizes and a laundry treating apparatus having the same.

The present disclosure is directed to providing a supporting device capable of improving a fastening force between the supporting device and a laundry treating apparatus and a laundry treating apparatus having the same.

Technical Solution

An aspect of the present disclosure provides a laundry treating apparatus including a laundry treating apparatus main body, a supporting device main body configured to support the laundry treating apparatus main body, a leg coupled to a bottom of the laundry treating apparatus main body, and a supporter installed in the supporting device main body, wherein the supporter includes a guide member configured to accommodate the leg and including an insertion groove, and a fixing member including a fixing protrusion to be inserted into the insertion groove, the fixing member being coupled to the guide member to fix the leg.

The fixing member may include a fastening portion provided at one end of the fixing protrusion and including a fastening hole, and the fastening portion may be provided to be inclined with respect to a direction in which the fixing protrusion extends.

The guide member may further include a fastening groove provided to correspond to the fastening hole, and a direction in which the fastening groove extends may be inclined with respect to an upper surface of the supporting device main body.

The guide member may include at least one accommodating portion to accommodate the leg.

The fixing protrusion may include a pair of the fixing protrusions, and the leg may be disposed between the pair of fixing protrusions.

The fixing member may include a plurality of leg holes formed between the pair of fixing protrusions and having different sizes.

When the leg is accommodated in the guide member, one side of each of the plurality of leg holes may be opened so that the pair of fixing protrusions are inserted into the insertion groove.

The guide member may further include a rib to reinforce the strength of the guide member.

The fixing member may further include a flange portion formed by bending a portion of the fixing protrusion to increase the rigidity of the fixing protrusion.

The fixing protrusion may include a pair of the fixing protrusions, and the fixing member may further include a connection portion to connect the pair of fixing protrusions, and a fastening portion provided on one side of the connection portion and including a fastening hole.

The guide member may further include a fastening groove provided to correspond to the fastening hole, and a direction in which a fastening member is inserted into the fastening hole and the fastening groove may be inclined with respect to an upper surface of the supporting device main body.

The guide member may guide the fixing protrusion to be inserted into the insertion groove.

The guide member may further include a guide stopper configured to limit the movement of the fixing protrusion upward.

The fixing protrusion may include a pair of the fixing protrusions, the fixing member may further include a connection portion to connect the pair of fixing protrusions, and a thickness of each of the pair of fixing protrusions and a thickness of the connection portion may become thinner toward a direction in which the fixing protrusions extends.

The supporter may accommodate and fix the leg without a separate fastening member by inserting the fixing protrusion into the insertion groove.

The laundry treating apparatus may include a washing machine and a dryer.

Another aspect of the present disclosure provides a supporting device including a supporting device main body configured to support a laundry treating apparatus, and a supporter installed in the supporting device main body and configured to accommodate and fix a leg coupled to a bottom of a laundry treating apparatus main body, wherein the supporter includes a guide member configured to accommodate the leg and including a fastening groove, a fixing member coupled to the guide member to fix the leg and including a fastening hole corresponding to the fastening groove, and a fastening member configured to be inserted into the fastening hole and the fastening groove in a direction of being inclined with respect to an upper surface of the supporting device main body.

The fixing member may further include a fastening portion including the fastening hole, and a pair of fixing protrusions provided to be inclined with respect to the fastening portion, and the leg may be disposed between the pair of fixing protrusions.

The guide member may further include an insertion groove to allow each of the pair of fixing protrusions to be inserted, and a stopper forming a portion of the insertion groove and configured to limit the movement of each of the pair of fixing protrusions upward.

The fixing member may include a plurality of leg holes formed between the pair of fixing protrusions and having one open side.

Another aspect of the present disclosure provides a supporter configured to be installed in a supporting device to accommodate a leg coupled to a bottom of a laundry treating apparatus main body and including a guide member including a plurality of insertion grooves, and a fixing member coupled to the guide member to fix the leg and including a plurality of fixing protrusions to be inserted into the plurality of insertion grooves, respectively.

Advantageous Effects

According to the present disclosure, a supporting device with improved easy assembly and a laundry treating apparatus having the same can be provided.

According to the present disclosure, a single common supporting device capable of supporting laundry treating apparatuses having different leg sizes and a laundry treating apparatus having the same can be provided.

According to the present disclosure, a supporting device and a laundry treating apparatus having improved fastening force between the supporting device and the laundry treating apparatus can be provided.

MODE OF THE DISCLOSURE

The embodiments described in the present specification and the configurations shown the drawings are only examples of preferred embodiments of the present disclosure, and various modifications may be made at the time of filing of the present disclosure to replace the embodiments and drawings of the present specification.

The terms used herein are for the purpose of describing the embodiments and are not intended to restrict and/or to limit the present disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component.

Hereinafter, embodiments of the present disclosure will be described in detail with reference to the accompanying drawings.

Figure 1:
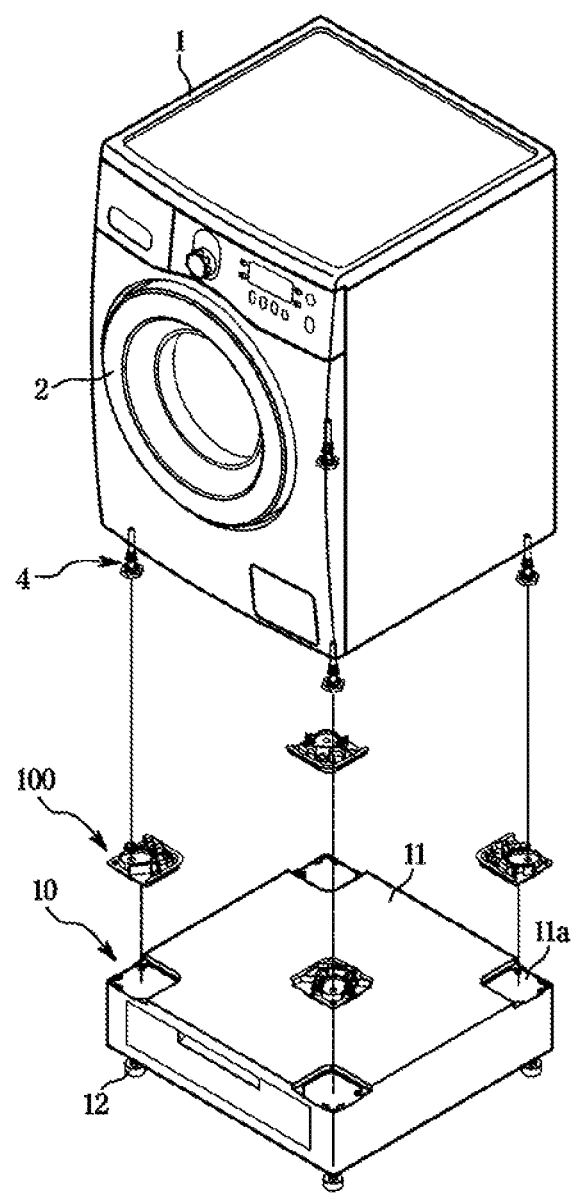
FIG. 1 is a view illustrating a state in which a laundry treating apparatus main body, a supporting device main body, and a supporter are separated from each other according to an embodiment of the present disclosure.

FIG. 1 is a view illustrating a state in which a laundry treating apparatus main body, a supporting device main body, and a supporter are separated from each other according to an embodiment of the present disclosure.

As illustrated in FIG. 1, a laundry treating apparatus according to the present disclosure may include a laundry treating apparatus main body 1 having an open front side to allow laundry to be put in or out and forming an exterior, a drum (not shown) installed inside the laundry treating apparatus main body 1 to accommodate clothes, and a door 2 installed on the open front side of the laundry treating apparatus main body 1. A leg 4 may be coupled to each corner of a bottom of the laundry treating apparatus main body 1 to extend downward from the laundry treating apparatus main body 1.

The leg 4 may include a flare part 5 and a column part 6. The flare part 5 may stably support the laundry treating apparatus main body 1 by increasing a contact area with the bottom. The column part 6 may be provided to connect the flare part 5 and the laundry treating apparatus main body 1.

The supporting device main body 10 configured to support the laundry treating apparatus main body 1 at a predetermined height may be formed in a box shape having an upper surface 11, a front surface, left and right side surfaces, a lower surface, and a rear surface. A supporter seating portion 11a may be provided on the upper surface 11 of the supporting device main body 10. The supporter seating portion 11a may be provided at four corners of the upper surface 11 of the supporting device main body.

A supporter 100 configured to accommodate and fix the leg 4 of the laundry treating apparatus main body 1 may be coupled to the supporting device main body 10. A supporting device leg 12 extending downward may be coupled to each corner of a bottom of the supporting device main body 10.

Figure 2:
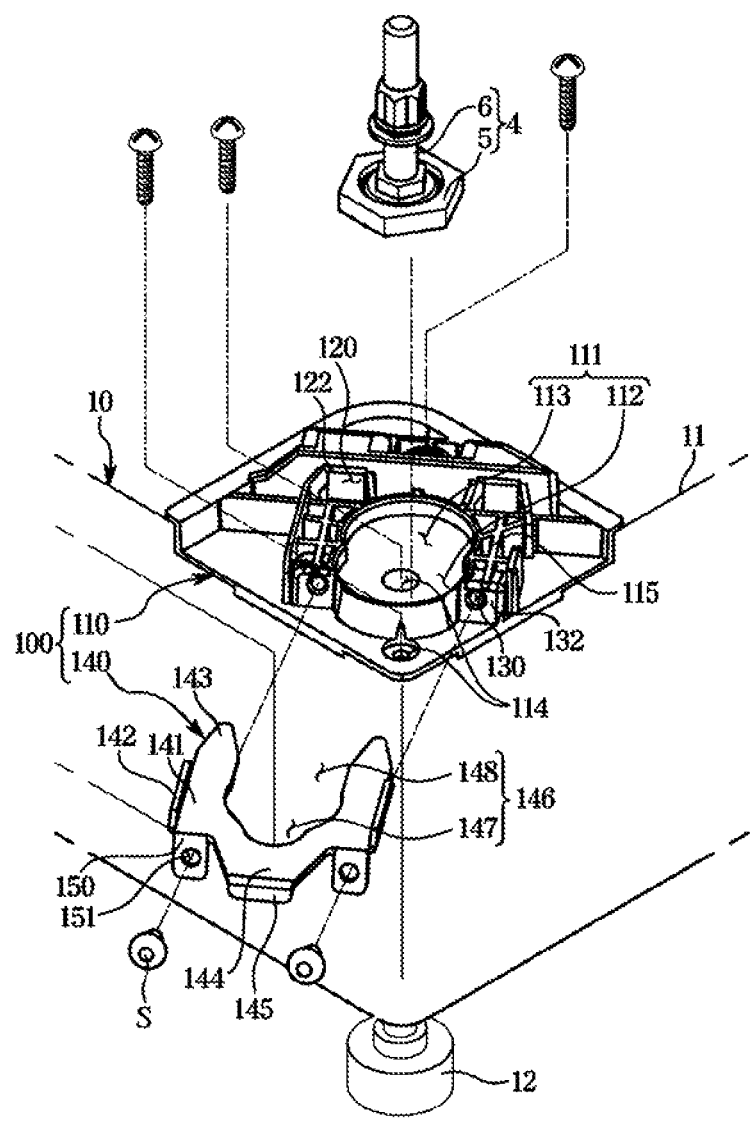
FIG. 2 is an enlarged view illustrating a relationship in which a leg of a laundry treating apparatus, one side of the supporting device main body, and the supporter are combined with each other according to an embodiment of the present disclosure.

FIG. 2 is an enlarged view illustrating a relationship in which a leg of a laundry treating apparatus, one side of the supporting device main body, and the supporter are combined with each other according to an embodiment of the present disclosure.

As illustrated in FIG. 2, the supporter 100 according to an embodiment of the present disclosure may include a guide member 110 configured to accommodate the leg 4 coupled to the laundry treating apparatus main body 1 to limit the movement of the leg 4 in a planar direction, and a fixing member 140 configured to constrain the movement of the leg 4 in the planar direction and in the vertical direction.

The guide member 110 may include at least one accommodating portion 111 to accommodate the leg 4 of the laundry treating apparatus main body 1. An outer circumference of the accommodating portion 111 may be formed in a shape in which at least two or more circles having the same diameter or different in diameter are connected to communicate with each other. According to an embodiment of the present disclosure, the accommodating portion 111 may accommodate one of the washing machine leg 4 and a dryer leg 4a (see FIG. 8). The accommodating portion 111 may include a first accommodating portion 112 provided to accommodate the washing machine leg 4, and a second accommodating portion 113 provided to accommodate the dryer leg 4a. The first accommodating portion 112 and the second accommodating portion 113 may be connected to communicate with each other. The leg 4 seated on the accommodating portion 111 may be limited in movement in the planar direction. The shape of the outer circumference of the accommodating portion 111 is not limited to a plurality of circular shapes in communication with each other. Unlike the drawing, the outer circumference of the accommodating portion 111 may be formed in a polygonal shape to correspond to the shape of a lower surface of the leg 4.

The guide member 110 may further include at least one coupling hole 114 to allow the supporting device main body 10 and the supporter 100 to be coupled. As illustrated in FIG. 2, a coupling member may be coupled to the supporter seating portion 11a by passing through the coupling hole 114. Through this, the supporting device main body 10 and the guide member 110 may be coupled to each other.

The guide member 110 may include an insertion groove 115. The insertion groove 115 may be provided to accommodate a guide portion 143 of a fixing protrusion 141, which will be described later. A plurality of the insertion grooves 115 may be provided to correspond to the fixing protrusions 141.

The guide member 110 may include a fastening groove 130. The fastening groove 130 is provided with a female threaded portion 131 (see FIG. 7) so that a fastening member S may be screwed. According to an embodiment of the present disclosure, a plurality of the fastening grooves 130 may be provided. For example, a pair of the fastening grooves 130 may be provided.

The guide member 110 may include a rib 115 to reinforce the strength of the guide member 110. The rib 115 may be provided on an upper surface of the guide member 110. Although not shown in the drawing, the rib may also be provided on a lower surface of the guide member.

The guide member 110 may be coupled to the supporter seating portion 11a. As described above, the supporter seating portion 11a may be provided at each of the four corners of the upper surface 11 of the supporting device main body 10. The guide member 110 may be disposed such that the fastening groove 130 faces the corner of the supporting device main body 10.

The supporter 100 may include the fixing member 140 provided to fix the leg 4 by being coupled to the guide member 110.

The fixing member 140 may be provided to be coupled to the guide member 110. The fixing member 140 may be coupled to the guide member 110 to limit the leg 4 from moving upward. Also, the fixing member 140 may be coupled to the guide member 110 to limit the leg 4 from moving in the planar direction.

The fixing member 140 may include the fixing protrusion 141 provided to be inserted into the insertion groove 120 of the guide member 110. The fixing member 140 may include the guide portion 143 provided at an end of the fixing protrusion 141. The guide portion 143 may be formed such that a width thereof is narrowed along a length direction of the fixing protrusion 141. The guide portion 143 may guide the fixing protrusion 141 to be smoothly inserted into the insertion groove 120 by reducing the width of the fixing protrusion 141 that is inserted into the insertion groove 120.

The fixing member 140 may include a flange portion 142 to reinforce the rigidity of the fixing protrusion 141. The flange portion 142 may be formed by bending a portion of the fixing protrusion 141. The flange portion 142 may be formed by bending upward or downward from the fixing protrusion 141. As the flange portion 142 is provided, a relatively larger force is required to bend the fixing protrusion 141. In other words, the rigidity of the fixing protrusion 141 against bending may be increased.

A plurality of the fixing protrusions 141 may be provided. For example, a pair of the fixing protrusions 141 may be provided. When a pair of the fixing protrusions 141 are provided, the leg 4 may be disposed between the pair of fixing protrusions 141. A leg hole 146 may be provided between the pair of fixing protrusions 141.

The leg hole 146 may include a first leg hole 147 and a second leg hole 148 having different sizes. Legs having different sizes may be inserted into the first leg hole 147 and the second leg hole 148, respectively. The first leg hole 147 and the second leg hole 148 may communicate with each other. At least one sides of the first leg hole 147 and the second leg hole 148 may be open. One side of the first leg hole 147 may be open to communicate with the second leg hole 148. Both sides of the second leg hole 148 may be open. One open side of the second leg hole 148 may communicate with the first leg hole 147. The other open side of the second leg hole 148 may allow the pair of fixing protrusions 141 to be separated from each other.

The first leg hole 147 may be formed smaller than the flare part 5 so that the flare part 5 of the washing machine leg 4 may not pass therethrough. The first leg hole 147 may be formed larger than the column part 6 so that the column part 6 of the leg washing machine 4 may pass therethrough.

The second leg hole 148 may be formed smaller than the flare part 5a so that the flare part 5a of the dryer leg 4a may not pass therethrough. The second leg hole 148 may be formed larger than a column part 6a so that the column part 6a of the dryer leg 4a may pass therethrough.

The fixing member 140 may include a fastening portion 150. When the guide portion 143 is provided at one end of the fixing protrusion 141, the fastening portion 150 may be provided at the other end of the fixing protrusion 141. The fastening portion 150 may be formed by bending the other end of the fixing protrusion 141. The fastening portion 150 may be provided to be inclined with respect to the fixing protrusion 141. The fastening portion 150 may include a fastening hole 151 through which the fastening member S is inserted.

The fixing member 140 may include a connection portion 144 to connect the pair of fixing protrusions 141. The connection portion 144 may be disposed on the same plane as the fixing protrusion 141. A handle portion 145 may be provided on one side of the connection portion 144. The handle portion 145 may be formed by bending a portion of the connection portion 144 downward.

Figure 3:
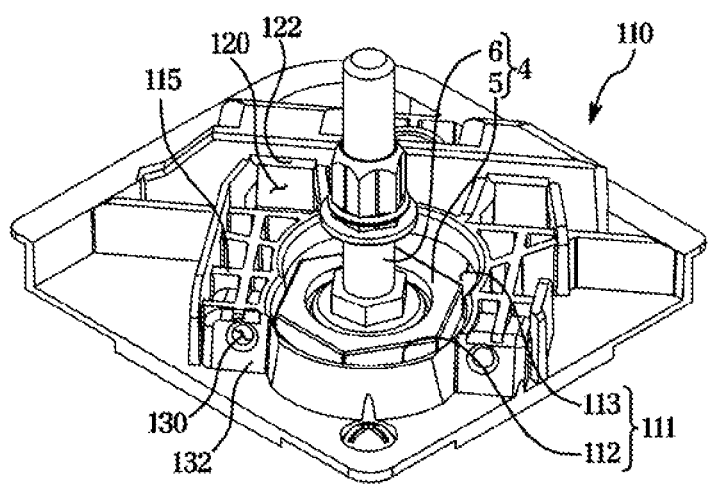
FIGS. 3 to 5 are views illustrating processes in which the supporter according to an embodiment of the present disclosure couples and fixes the leg provided in the laundry treating apparatus main body to the supporting device main body.
Figure 4:
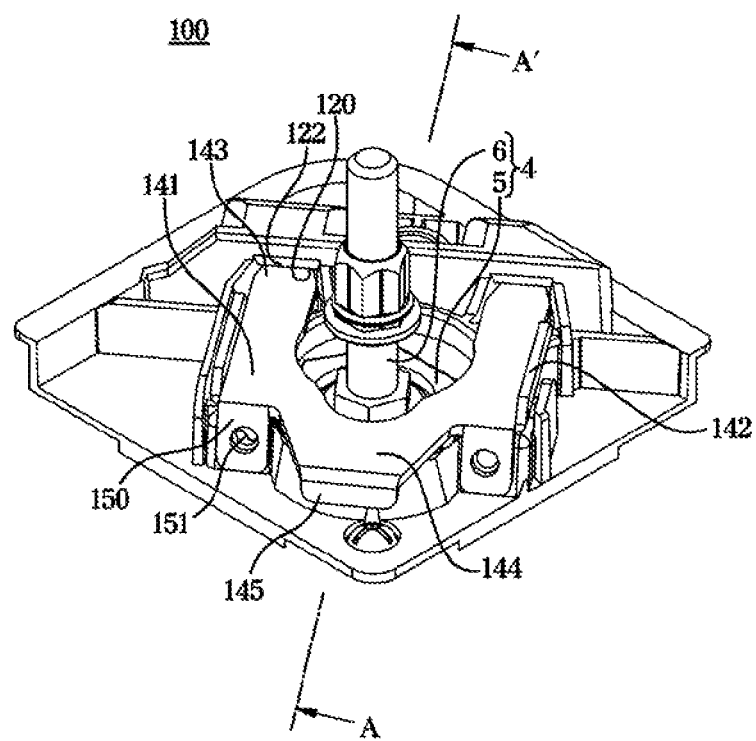
Figure 5:
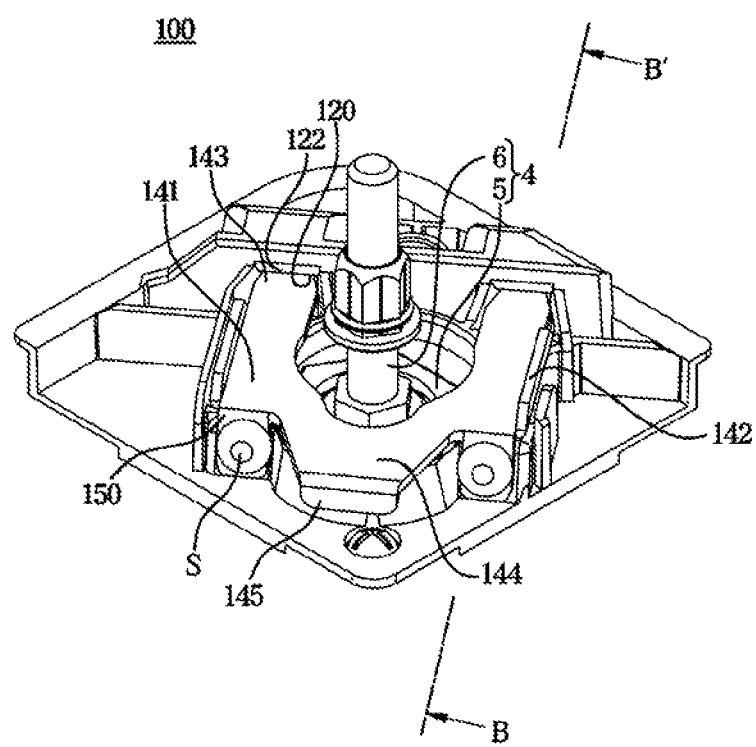

FIGS. 3 to 5 are views illustrating processes in which the supporter according to an embodiment of the present disclosure couples and fixes the leg provided in the laundry treating apparatus main body to the supporting device main body.

Hereinafter, processes in which the supporter according to an embodiment of the present disclosure couples and fixes the leg provided in the laundry treating apparatus main body to the supporting device main body will be described in detail.

Referring to FIG. 3, the leg 4 may be accommodated in the accommodating portion 111 of the guide member 110. The first accommodating portion 112 and the second accommodating portion 113 communicate with each other, so that a boundary therebetween may not be clearly distinguished. The leg 4 may be accommodated in one of the first accommodating portion 112 and the second accommodating portion 113 or may be accommodated between the first accommodating portion 112 and the second accommodating portion 113.

Referring to FIG. 4, after the leg 4 is accommodated in the accommodating portion 111, the fixing member 140 may be primarily coupled to the guide member 110. As the guide portion 143 of the fixing protrusion 141 is inserted into the insertion groove 120, the fixing member 140 may be primarily coupled to the guide member 110. When the fixing member 140 is primarily coupled to the guide member 110, the fixing member 140 is not fixed to the guide member 110. Accordingly, when the fixing member 140 is primarily coupled to the guide member 110, the fixing member 140 does not limit the movement of the leg 4 in the vertical direction.

Referring to FIG. 5, as the fastening member S passes through the fastening hole 151 and is screwed to the fastening groove 130, the fixing member 140 and the guide member 110 may be completely coupled to each other. Because the fixing member 140 presses the flare part 5 of the leg 4 downward, not only the movement of the leg 4 in the vertical direction but also the movement in the planar direction is limited. Accordingly, the leg 4 may be fixed to the upper surface 11 of the supporting device main body 10.

Figure 6:
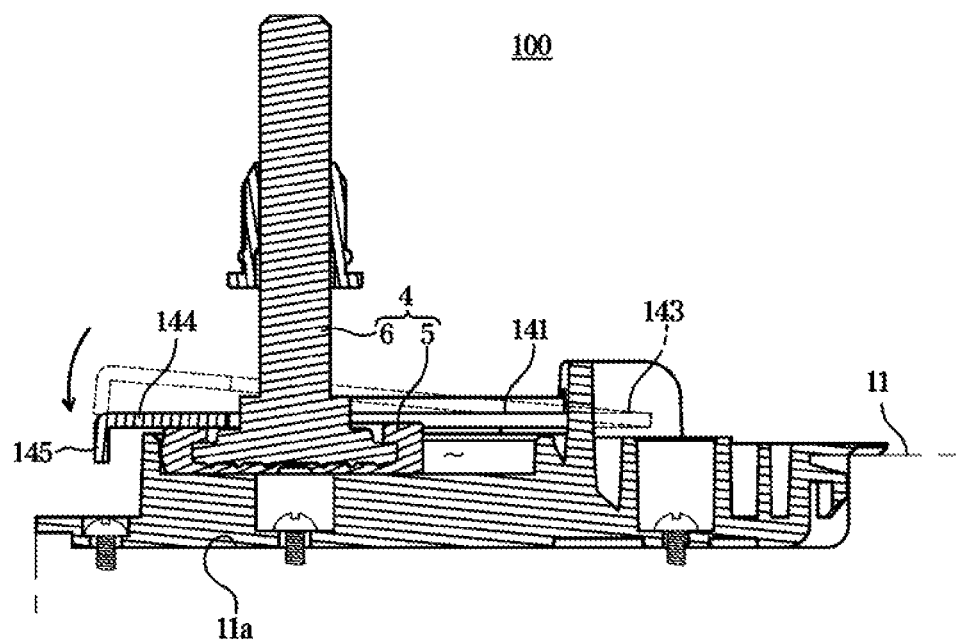
FIG. 6 is a cross-sectional view taken along line A-A' in FIG. 4.
Figure 7:
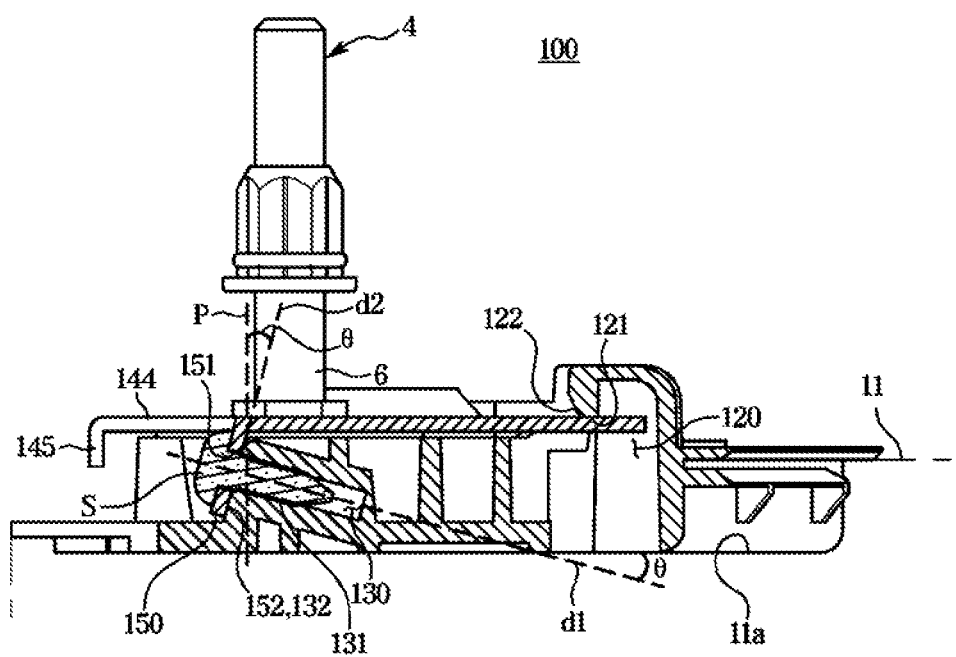
FIG. 7 is a cross-sectional view taken along line B-B' in FIG. 5.

FIG. 6 is a cross-sectional view taken along line A-A' in FIG. 4, and FIG. 7 is a cross-sectional view taken along line B-B' in FIG. 5.

Referring to FIG. 6, when the fixing member 140 is primarily coupled to the guide member 110, the fixing member 140 may rotate within a predetermined range in the vertical direction. When the fixing member 140 is completely coupled to the guide member 110, a distance between the fixing member 140 and the accommodating portion 111 may be provided smaller than a height of the flare part 5. Because the flare part 5 is disposed between the fixing member 1440 and the accommodating portion 111, a portion of the flare part 5 may be deformed by pressure in the vertical direction. By this structure, a fastening force between the leg 4 and the supporter 100 may be enhanced.

Referring to FIG. 7, a fastening direction of the fastening member S may have a predetermined angle θ with respect to the upper surface 11 of the supporting device main body 10. The fastening member S may be inserted into and coupled to the fastening groove 130 in a direction of being inclined with respect to the upper surface 11 of the supporting device main body. As the fastening direction of the fastening member S has the predetermined angle θ with respect to the upper surface 11 of the supporting device main body, improved easy assembly may be performed. Compared with when the fastening direction of the fastening member S is parallel to the upper surface of the supporting device main body, a worker may insert and fasten the fastening member S into and to the fastening groove 130 at a relatively high position. When fastening work is required while maintaining a low posture, the work efficiency of the worker may be degraded because the posture is uncomfortable. According to an embodiment of the present disclosure, the worker may perform the fastening work while maintaining a relatively high posture, so that improved easy assembly may be performed and work efficiency may be improved.

In addition, when the fastening direction of the fastening member S has the predetermined angle θ with respect to the upper surface 11 of the supporting device main body, stress applied to the fastening member S, the fixing member 140 and the guide member 110 may be distributed, and the possibility of damage to the supporter 100 may be reduced. Specifically, when the fastening direction of the fastening member S is parallel to the upper surface 11 of the supporting device main body, stress may be concentrated on an upper end of the fastening member S, an upper end of the fastening hole 151 and an upper end of the fastening groove 130. When the stress is concentrated, the possibility of damage to any one of the fastening member S, the fastening portion 150, and the fastening groove 130 increases, and thus the stress needs to be distributed.

As illustrated in FIG. 7, when the fastening direction of the fastening member S has the predetermined angle θ with the upper surface 11 of the supporting device main body, the stress may be distributed. Specifically, a first fastening surface 132 of the guide member 110 and a second fastening surface 152 of the fixing member 140 come into contact with each other, and stress may be distributed to the first fastening surface 132 and the second fastening surface 152. Also, the stress may be distributed through a contact surface between the fastening member S and the fastening portion 150. As described above, the possibility of damage to the supporter 100 may be reduced by distributing the stress, which may mean improved durability.

In order for the fastening direction of the fastening member S to have the predetermined angle θ with the upper surface 11 of the supporting device main body, the supporter 100 according to an embodiment of the present disclosure may have the following structural characteristics.

A direction d1 in which the fastening groove 130 extends may have the predetermined angle θ with respect to the upper surface 11 of the supporting device main body. The predetermined angle θ may be between 10 degrees and 30 degrees.

The fastening portion 150 may be provided to have a predetermined angle (90 degrees+θ) with respect to a direction in which the fixing protrusion 141 extends. In other words, a direction d2 in which the fastening portion 150 extends may have the predetermined angle θ with respect to a direction p perpendicular to an upper surface of the fixing protrusion 141.

Figure 8:
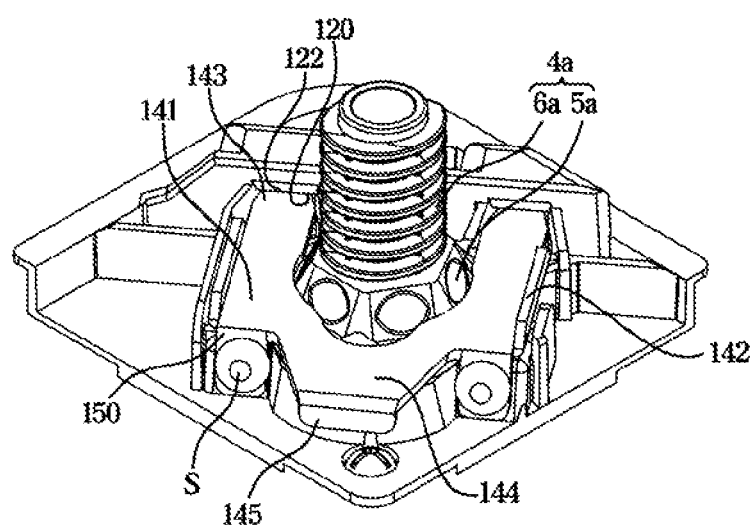
FIG. 8 is a view illustrating that the supporter according to an embodiment of the present disclosure fixes a leg having a size different from that of FIGS. 1 to 7.

FIG. 8 is a view illustrating that the supporter according to an embodiment of the present disclosure fixes a leg having a size different from that of FIGS. 1 to 7, and FIG. 9 is a view for explaining that a fixing member in the supporter according to an embodiment of the present disclosure may fix legs having different sizes.

Figure 9:
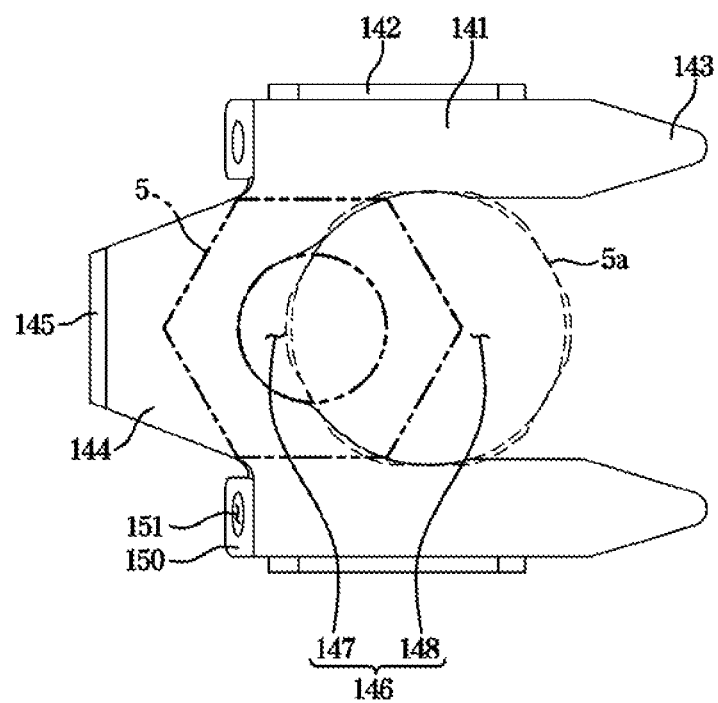
FIG. 9 is a view for explaining that a fixing member in the supporter according to an embodiment of the present disclosure may fix legs having different sizes.

Referring to FIGS. 8 and 9, the supporter 100 according to an embodiment of the present disclosure may commonly fix legs having different sizes and shapes. As illustrated in FIG. 8, the dryer leg 4a may have a structure different from that of the washing machine leg 4. The supporter 100 according to an embodiment of the present disclosure may fix not only the washing machine leg 4 but also the dryer leg 4a without a separate structural change.

To this end, the plurality of first leg holes 147 may be provided between the fixing protrusions 141. As described above, the washing machine leg 4 may be inserted into the first leg hole 147, and the dryer leg 4a may be inserted into the second leg hole 148.

Figure 10:
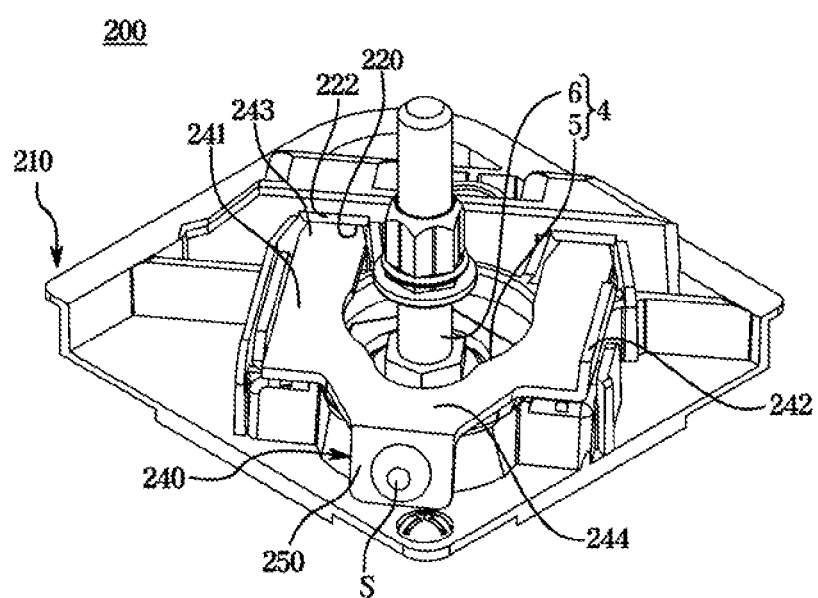
FIG. 10 is a view illustrating that a supporter according to another embodiment of the present disclosure fixes the leg coupled to the laundry treating apparatus.

FIG. 10 is a view illustrating that a supporter according to another embodiment of the present disclosure fixes the leg coupled to the laundry treating apparatus.

Referring to FIG. 10, a supporter 200 according to another embodiment of the present disclosure may reduce the number of the fastening members S. As illustrated in FIG. 10, a fixing member 240 may include one fastening portion 250 and a fastening hole (not shown), and a guide member 210 may include one fastening groove (not shown). By reducing the number of fastening, more convenient assembly is possible and the time required for assembly may be reduced. In addition, work efficiency may be improved.

Figure 11:
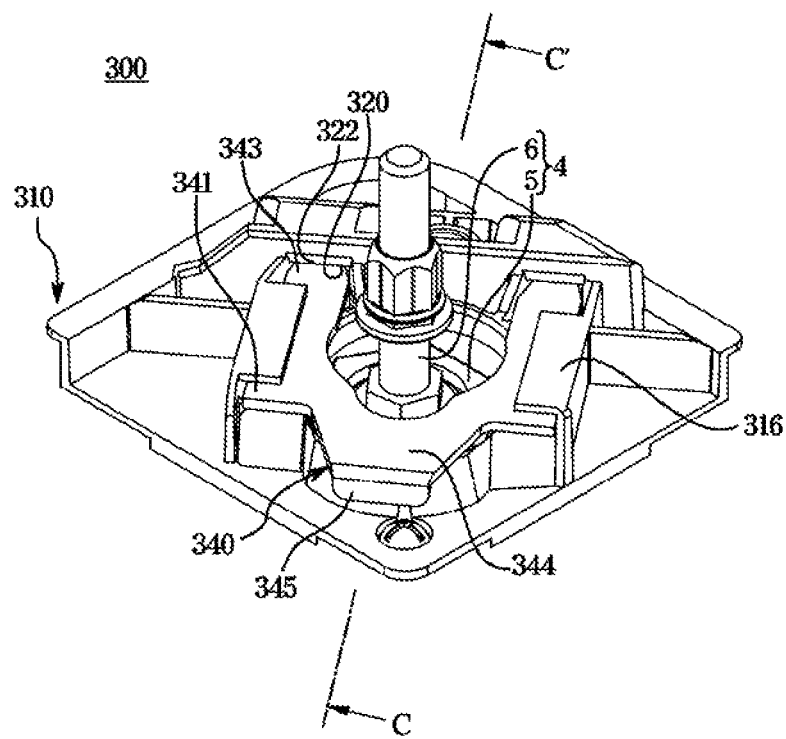
FIG. 11 is a view illustrating that a supporter according to another embodiment of the present disclosure fixes the leg coupled to the laundry treating apparatus.
Figure 12:
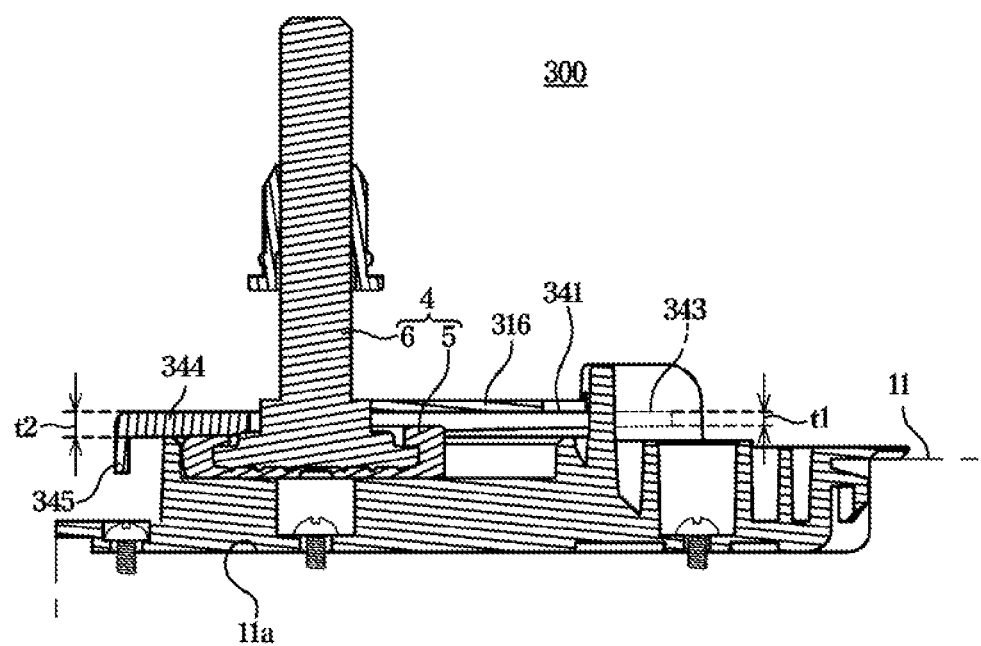
FIG. 12 is a cross-sectional view taken along line C-C' in FIG. 11.

FIG. 11 is a view illustrating that a supporter according to another embodiment of the present disclosure fixes the leg coupled to the laundry treating apparatus, and FIG. 12 is a cross-sectional view taken along line C-C' in FIG. 11.

Referring to FIGS. 11 and 12, according to another embodiment of the present disclosure, a supporter 300 may not include a separate fastening member. A fixing member 340 may be coupled to a guide member 310 without a fastening member. The fixing member 340 may not include a fastening portion, and the guide member 310 may not include a fastening groove.

The guide member 310 may include a guide stopper 316. The guide stopper 316 may guide a fixing protrusion 341 so that the fixing protrusion 341 is inserted into an insertion groove 320. The guide stopper 316 may also be provided to limit the movement of the fixing protrusion 341 upward. The guide stopper 316 may function as a rail portion guiding and limiting the fixing protrusion 341.

Referring to FIG. 12, the fixing member 340 may be provided to have a variable thickness. This is for the fixing member 340 to stably support the leg 4 without a separate fastening member. A thickness t1 of one end of the fixing member 340 may be formed smaller than a thickness t2 of the other end of the fixing member 340. More specifically, the fixing member 340 may be configured to have the smallest thickness t1 at an end of a guide portion 343 and the largest thickness t2 at an end of a connection portion 344. Due to the variation in thickness of the fixing member 340, as the fixing member 340 is inserted into the insertion groove 320, the leg 4 may be fixed with a strong fastening force by the fixing member 340.

The foregoing has illustrated and described specific embodiments. However, it should be understood by those of skilled in the art that the disclosure is not limited to the above-described embodiments, and various changes and modifications may be made without departing from the technical idea of the disclosure described in the following claims.

The invention claimed is:

1. A laundry treating apparatus comprising:
   a laundry treating apparatus main body;
   a supporting device main body supporting the laundry treating apparatus main body;
   a leg coupled to a bottom of the laundry treating apparatus main body; and
   a supporter installed in the supporting device main body, wherein the supporter comprises:
      a guide member accommodating the leg and comprising an insertion groove, and
      a fixing member having at least one leg hole through which the leg is inserted, the fixing member comprising:
         a fixing protrusion inserted into the insertion groove,
         a fastening portion at one end of the fixing protrusion, inclined with respect to a direction in which the fixing protrusion longitudinally extends, and having a fastening hole, and
      a fastening member inserted into the fastening hole, so that the fixing member is coupled to the guide member.

2. The laundry treating apparatus according to claim 1, wherein
   the guide member further comprises a fastening groove provided to correspond to the fastening hole, and
   a direction in which the fastening groove longitudinally extends is inclined with respect to an upper surface of the supporting device main body.

3. The laundry treating apparatus according to claim 1, wherein
   the guide member comprises at least one accommodating portion accommodating the leg.

4. The laundry treating apparatus according to claim 1, wherein
   the fixing protrusion comprises a pair of the fixing protrusions,
   the at least one leg hole is between the pair of fixing protrusions.

5. The laundry treating apparatus according to claim 4, wherein
   the at least one leg hole comprises a plurality of leg holes having different sizes.

6. The laundry treating apparatus according to claim 5, wherein one side of each leg hole of the plurality of leg holes is opened so that the pair of fixing protrusions are inserted into the insertion groove.

7. The laundry treating apparatus according to claim 1, wherein
the guide member further comprises a rib to reinforce strength of the guide member.

8. The laundry treating apparatus according to claim 1, wherein
the fixing member further comprises a flange portion that is a bent portion of the fixing protrusion, to increase rigidity of the fixing protrusion.

9. The laundry treating apparatus according to claim 1, wherein
the fixing protrusion comprises a pair of the fixing protrusions,
the fixing member further comprises a connection portion connecting the pair of fixing protrusions, and
the flail fastening portion is on one side of the connection portion.

10. The laundry treating apparatus according to claim 9, wherein
the guide member further comprises a fastening groove, and
the fastening member is inserted into the fastening hole and the fastening groove in a direction that is inclined with respect to an upper surface of the supporting device main body.

11. The laundry treating apparatus according to claim 1, wherein
the guide member is configured to guide the fixing protrusion to be inserted into the insertion groove, and
the guide member further comprises a guide stopper configured to limit movement of the fixing protrusion upward.

12. The laundry treating apparatus according to claim 11, wherein
the fixing protrusion comprises a pair of the fixing protrusions,
the fixing member further comprises a connection portion connecting the pair of fixing protrusions, and
a thickness of each fixing protrusion of the pair of fixing protrusions and a thickness of the connection portion become thinner toward the direction in which the fixing protrusions longitudinally extends.

13. The laundry treating apparatus according to claim 12, wherein
the supporter accommodates and fixes the leg without a separate fastening member by the fixing protrusion being inserted into the insertion groove.

14. The laundry treating apparatus according to claim 1, wherein the laundry treating apparatus comprises a washing machine and a dryer.

* * * * *